(12) United States Patent
Voth et al.

(10) Patent No.: US 9,050,751 B2
(45) Date of Patent: Jun. 9, 2015

(54) DEVICE FOR BLOW MOULDING CONTAINERS

(75) Inventors: Klaus Voth, Obertraubling (DE);
Florian Geltinger, Donaustauf (DE);
Eduard Handschuh, Regensburg (DE)

(73) Assignee: KRONES AG, Neutraubling (DE)

( * ) Notice: Subject to any disclaimer, the term of this patent is extended or adjusted under 35 U.S.C. 154(b) by 388 days.

(21) Appl. No.: 13/308,911

(22) Filed: Dec. 1, 2011

(65) Prior Publication Data

US 2012/0141621 A1    Jun. 7, 2012

(30) Foreign Application Priority Data

Dec. 1, 2010 (DE) .......................... 10 2010 052 903

(51) Int. Cl.
| | | |
|---|---|---|
| *B29C 49/58* | (2006.01) | |
| *B29C 49/78* | (2006.01) | |
| *B29C 49/42* | (2006.01) | |
| *B29C 49/36* | (2006.01) | |

(52) U.S. Cl.
CPC ............... *B29C 49/78* (2013.01); *B29C 49/36* (2013.01); *B29C 49/42* (2013.01); *B29C 49/4289* (2013.01); *B29C 49/58* (2013.01); *B29C 49/783* (2013.01)

(58) Field of Classification Search
USPC .......................... 425/149, 522, 529, 535, 135
See application file for complete search history.

(56) References Cited

U.S. PATENT DOCUMENTS

| | | | |
|---|---|---|---|
| 4,267,861 A | 5/1981 | Roth | |
| 4,644,969 A | 2/1987 | Watanabe | |
| 6,695,280 B2 * | 2/2004 | Litzenberg et al. | 251/63.5 |
| 6,905,326 B2 | 6/2005 | Voth et al. | |
| 2003/0019353 A1 | 1/2003 | Vogel et al. | |
| 2010/0316757 A1 * | 12/2010 | Rymann | 425/529 |

FOREIGN PATENT DOCUMENTS

| | | |
|---|---|---|
| DE | 199 56 575 A1 | 5/2001 |
| DE | 101 31 556 A1 | 1/2003 |
| EP | 0 882 921 A2 | 12/1998 |
| EP | 1 271 029 B1 | 1/2003 |
| EP | 1 293 329 A1 | 3/2003 |
| EP | 1 328 396 B1 | 7/2003 |
| EP | 2 078 890 A1 | 7/2009 |
| EP | 2 335 904 A1 | 6/2011 |

OTHER PUBLICATIONS

European Search Report dated Dec. 17, 2013, issued in corresponding European Application No. 11191606.0.

* cited by examiner

*Primary Examiner* — Joseph S Del Sole
*Assistant Examiner* — John Robitaille
(74) *Attorney, Agent, or Firm* — Novak Druce Connolly Bove + Quigg LLP

(57) ABSTRACT

A device with blow stations disposed on a blow wheel for blow molding containers from a thermoplastic material includes a unit for pneumatic control of a blow pressure. The pneumatic control unit has a control piston which is guided in a cylinder and is mounted so as to be movable in the direction of a longitudinal axis of the piston. A main flow path, which can be closed by the control piston, extends through the cylinder. The control piston is provided with a control surface which faces a control chamber of the cylinder and is designed to transmit a control force to the control piston. The control piston is constructed at least in some regions from a metal or a ceramic.

18 Claims, 6 Drawing Sheets

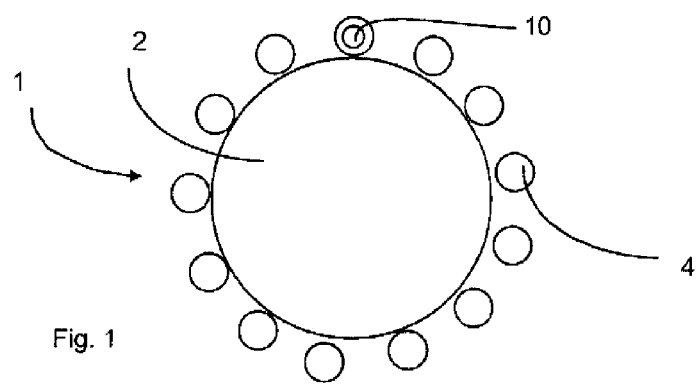
Fig. 1
Fig. 2a
(Prior Art)
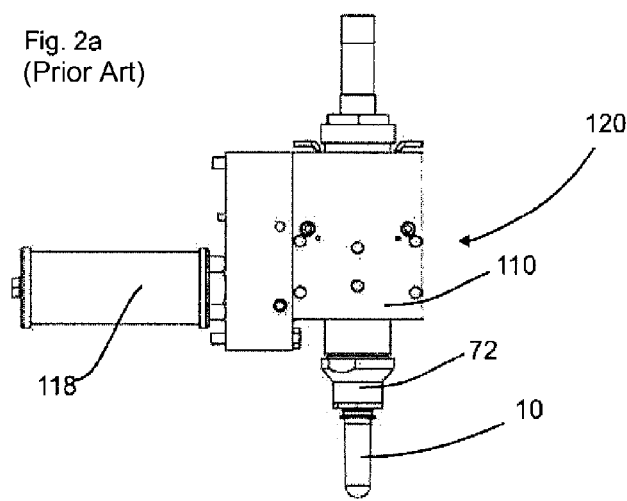
Fig. 2b
(Prior Art)
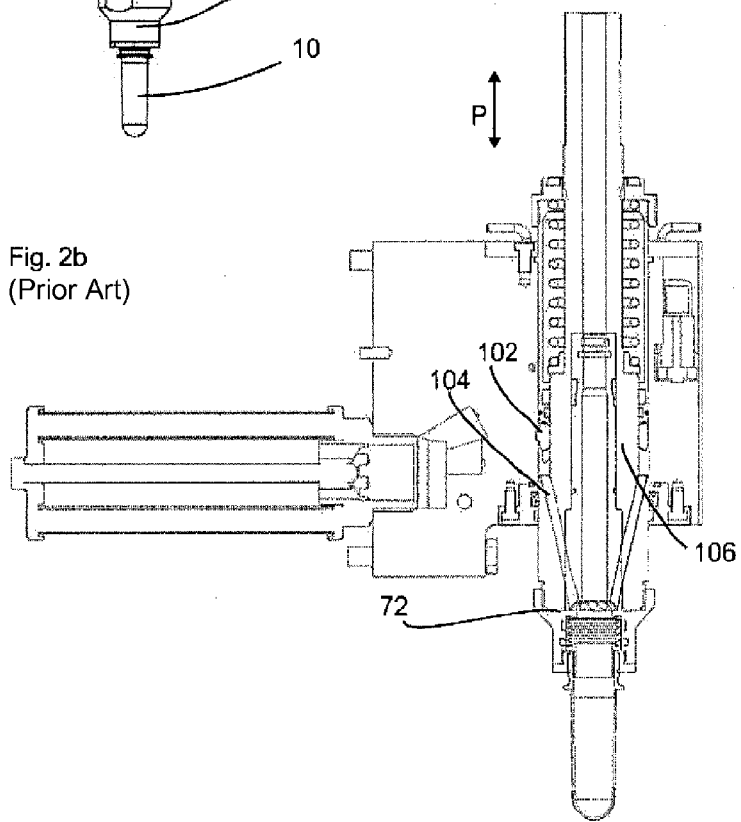

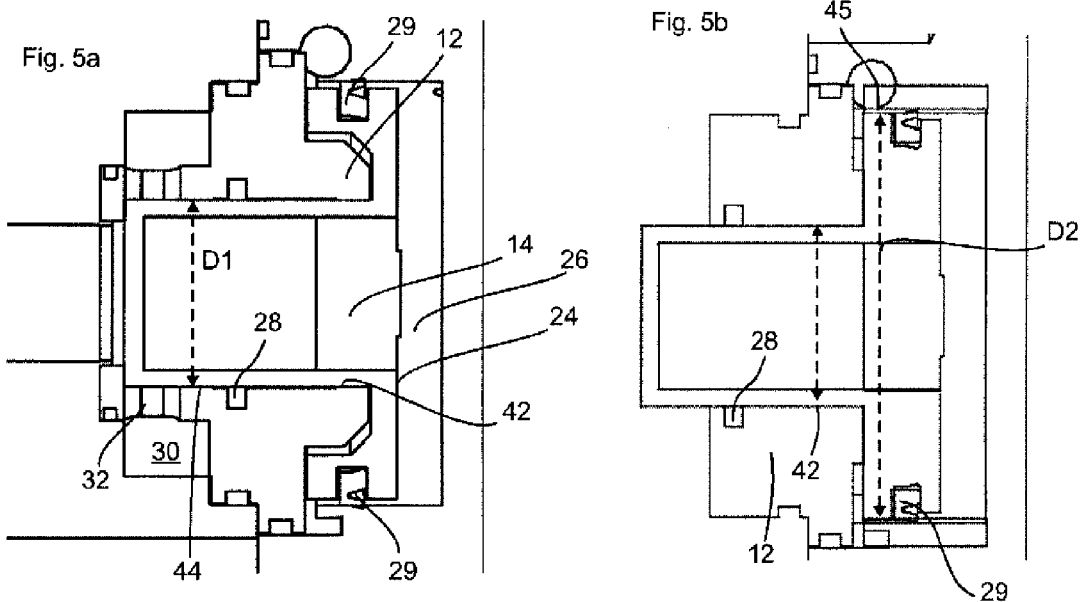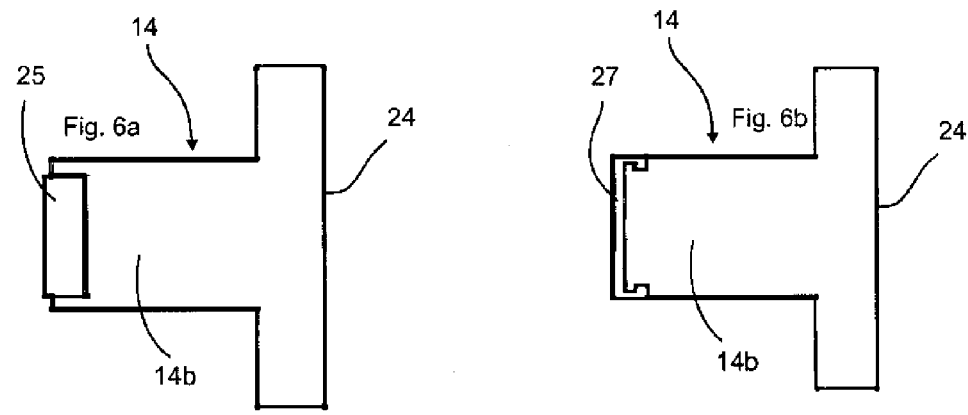

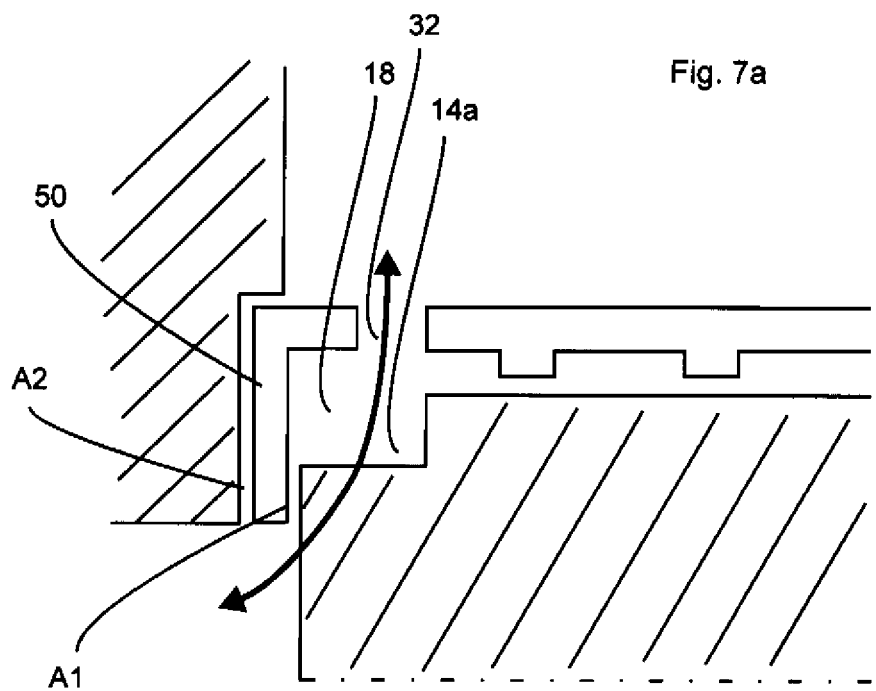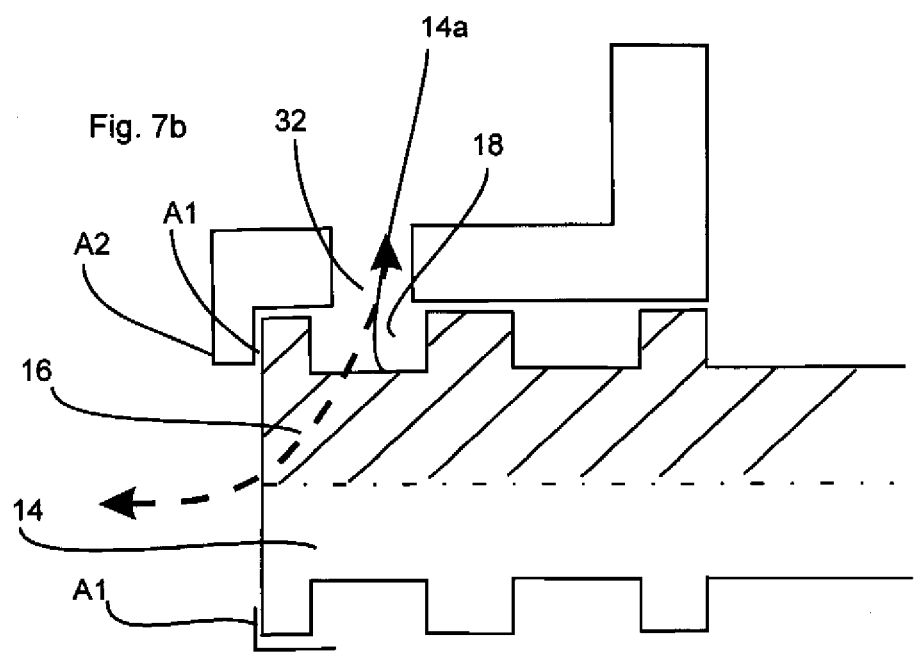

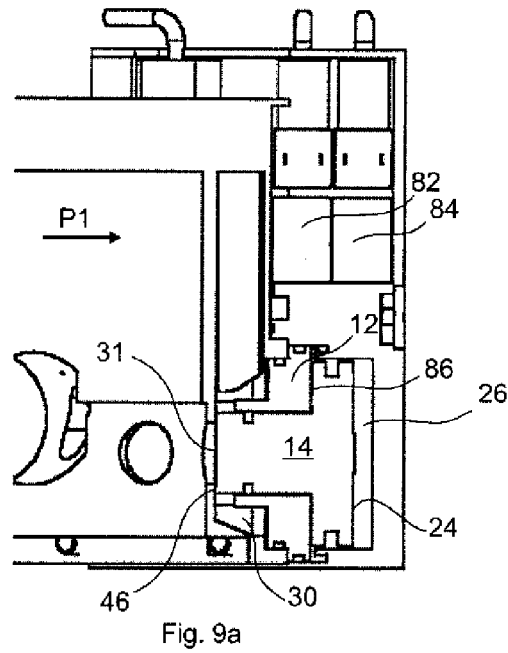
Fig. 9a
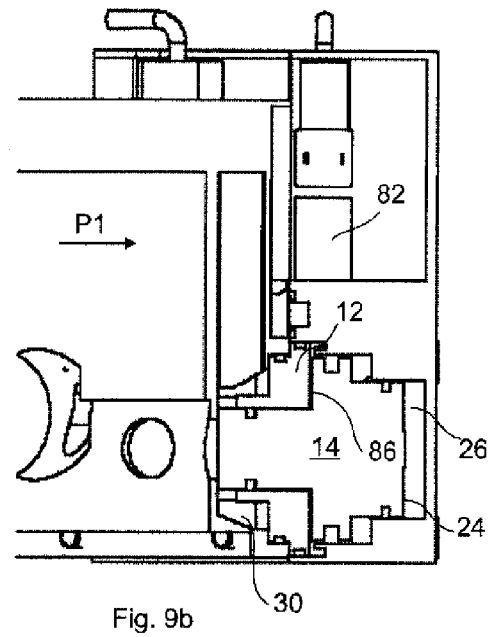
Fig. 9b
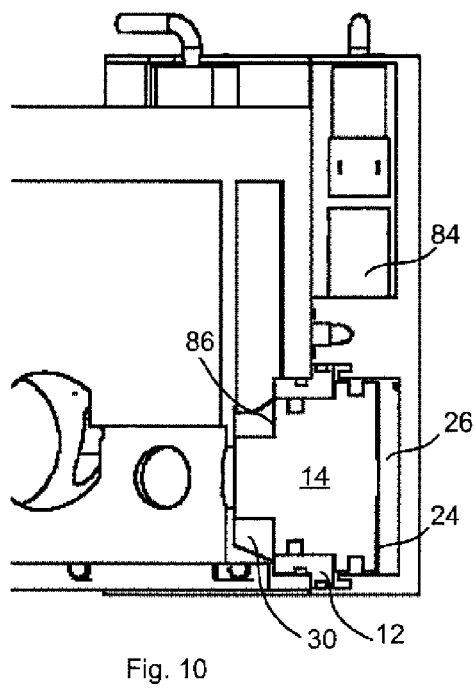
Fig. 10
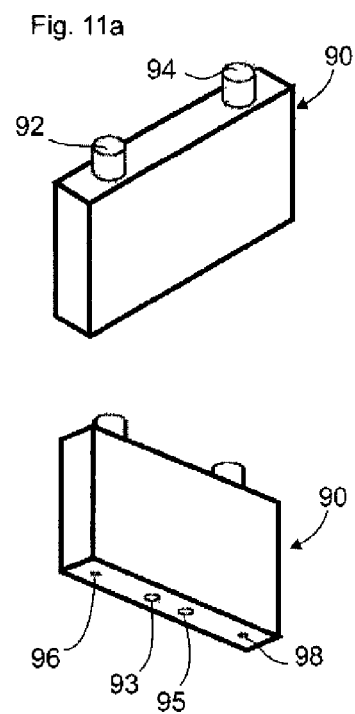
Fig. 11a
Fig. 11b

DEVICE FOR BLOW MOULDING CONTAINERS

CROSS-REFERENCE TO RELATED APPLICATION

This application claims the benefit of priority of German Patent Application No. 10 2010 052 903.6, filed Dec. 1, 2010, pursuant to 35 U.S.C. 119(a)-(d), the disclosure of which is incorporated herein by reference.

TECHNICAL FIELD

The present disclosure relates to a device for blow moulding containers.

BACKGROUND

Devices for blow moulding containers have long been known from the prior art. In this case plastic parisons, which are usually heated, are acted on by compressed air in order in this way to be reshaped into plastic containers. Such devices for reshaping plastic parisons into plastic containers usually have a blow wheel on which a plurality of blow stations is disposed. These blow stations in turn form hollow spaces within which the plastic parisons are expanded.

The compressed air is usually supplied to the plastic parisons by means of blow moulding dies. The blow pressure necessary for expansion of the plastic parisons is usually provided by means of valve blocks. Various configurations of these valve blocks or valve mechanisms are known from the prior art.

EP 1 328 396 B1 describes a blow moulding machine with a control valve mounted on the blow moulding device for controlling the blow air. In this case a valve body is provided which surrounds the blow moulding die in an annular manner at least over a part of its height. A low-pressure valve, a high-pressure valve and a venting valve are distributed over the periphery of the valve support and are connected to the blow moulding die by bores in the valve support.

A device for blow moulding containers is known from EP 1 271 029 B1. This device has a unit for pneumatically controlling the blow pressure and this unit has a control piston which is guided in a cylinder and is mounted in the direction of a longitudinal axis. In this case this control piston is constructed at least in some regions from a plastic. Due to this construction of some regions of the control piston from plastic a metal contact with the wall of the cylinder is avoided. In this way separate guide strips can be avoided. In addition this control piston made from plastic also has a lower weight and a reduced mass moment of inertia.

Although this device operates satisfactorily, it has been shown that some of the control pistons produced in this way are subject to increased wear.

Therefore it may be desirable to provide a device for blow moulding containers which has a longer service life.

SUMMARY

According to various aspects of the disclosure, a device for blow moulding containers has blow stations disposed on a blow wheel for blow moulding containers from a thermoplastic material. Furthermore the device has a unit for pneumatic control of a blow pressure, wherein the pneumatic control unit has a control piston which is guided in a cylinder and is mounted so as to be movable in the direction of a longitudinal axis of the piston, and wherein a main flow path which can be closed by the control piston extends through the cylinder—the cylinder also being denoted hereafter as a guide cylinder or generally as a guide body. Furthermore the control piston is provided with a control surface which faces a control chamber of the cylinder and is designed to transmit a control force to the control piston.

According to the disclosure a circumferential wall of the control piston blocks the main flow path in at least one position of the control piston. In other words, the main flow is blocked by a circumferential wall of the control piston in particular in a closed state of the unit.

Whereas in the prior art it is usually only the end faces of the control piston which block the main flow path for the blow air, it is proposed here that in addition at least the circumferential wall also blocks the main flow path. The containers are in particular plastic parisons or the plastic containers to be formed therefrom. Blocking is understood to mean that the said circumferential wall stands in the way of the main flow path. In this case the circumferential wall does not necessarily have to seal the main flow path. On the contrary, it is possible for sealing to take place by way of an end face of the control piston or a part of this end face.

In this case an inlet for the compressed air is in some aspects disposed in a circumferential wall of the cylinder. An inlet for the blow air or compressed air is in some aspects offset relative to the outlet in the longitudinal direction of the control piston, i.e. it is offset in height. In the prior art both the inlet for the compressed air and also the outlet for the compressed air are usually covered or blocked by an end face of the control piston. Within the context of the present disclosure it is proposed that at least either the inlet for the blow air or the outlet for the blow air, for example, in some aspects the inlet for the blow air, is blocked or (at least partially) shut off by a circumferential wall of the control piston in a closed state of the unit or of the valve. One possible advantage of this embodiment is that in this way a more uniform flow onto the control piston in the circumferential direction thereof is possible.

A further embodiment of a device according to the disclosure has blow stations disposed on a blow wheel for blow moulding containers from a thermoplastic material. Furthermore the device has a unit for pneumatic control of a blow pressure, wherein the pneumatic control unit has a control piston which is guided in a cylinder and is mounted so as to be movable in the direction of a longitudinal axis of the piston, and wherein a main flow path which can be closed by the control piston extends through the cylinder. Furthermore the control piston is provided with a control surface which faces a control chamber of the cylinder and is designed to transmit a control force to the control piston.

In this case according to the disclosure the control piston is constructed at least in some regions from a metal or a ceramic.

It is therefore proposed to provide a pneumatically control valve, the control piston of which is constructed in some regions from a metal or a ceramic. By this construction of the control piston from metal or ceramic the resistance of the control piston and thus of a movable valve element can be increased and in this way also extends the service life of the unit, i.e. of the valve, as a whole.

The main flow path is in some aspects disposed in such a way that when the control pressure is lowered the control piston is displaced in the direction of the longitudinal axis of the piston by the action of the high pressure. However, it would also be possible for the displacement of the control piston to take place not under the effect of the high pressure or blow pressure but in another way, for instance by an additional pilot valve, a spring, magnetic forces or the like.

The individual blow stations each have blow moulds within which plastic parisons can be expanded to form the plastic containers.

In an exemplary embodiment the cylinder has guide surfaces made at least partially from plastic for guiding the control piston. In this way a metal contact with the control piston can be avoided.

In an exemplary embodiment the main flow path is disposed in the cylinder. Whereas in the case of EP 1 271 029 the main flow path is disposed below the piston, it is proposed here that the main flow path is located in the cylinder or a circumferential wall of the cylinder itself. Therefore in this embodiment the said main flow path is not covered or sealed by a base surface of the control piston but by the external circumference of the control piston.

According to an exemplary embodiment the pneumatic control unit has a sealing surface for closing the main flow path, and this sealing surface is disposed on an external circumference of the cylinder. In this case the end face of the piston is not understood as the outer circumference. Thus it is proposed that the control piston is formed as an at least partially metal or ceramic piston and in some aspects as a metal piston or ceramic piston which may in some aspects be guided in a plastic bushing, wherein the said sealing surfaces are in some aspects also integrated into this plastic bushing. The sealing surface and the said guide for the control piston is in some aspects constructed in two parts.

In an exemplary embodiment the control piston is made entirely from a metal. The control piston is in some aspects made from aluminum.

In an exemplary embodiment the control piston has a hollow space. In this case this hollow space can be formed in the interior of the control piston. In other words, the interior of the piston can be hollowed out, for example machined out, in order to reduce the weight of the piston.

In an exemplary embodiment at least one sealing unit is disposed in the cylinder in order to seal the movement of the control piston (along the longitudinal direction thereof). More precisely, sealing surfaces are provided which are constructed to seal the movement of the control piston.

In an exemplary embodiment the device has an application chamber which surrounds the control piston in the circumferential direction thereof (or around the direction of movement thereof) and in particular can be supplied with blow air. This means that in contrast to the prior art the pressure is not applied to the control piston exclusively in the longitudinal direction thereof but around the entire circumference from the side. In this way a symmetrical flow onto the control piston is possible. The device in some aspects has at least two, and in some aspects at least three, and in some aspects a plurality of air ports disposed uniformly on the circumference of the control piston. In a closed state of the means or of the valve these air ports are in some aspects closed by the external circumference of the control piston.

In an exemplary embodiment the control piston has a displacement surface which with the application of compressed air—in particular in the radial direction of the control piston, i.e. a direction perpendicular to the longitudinal direction of the control piston—moves the control piston along the longitudinal axis of the piston. In the prior art the piston can be displaced directly by the air impinging in the longitudinal direction. Since, as mentioned above, in the embodiment illustrated here the air does not impinge on the control piston in a longitudinal direction but laterally, the said displacement surface is provided. This may for example be an oblique surface which is disposed on the piston end and which when acted upon by compressed air effects a movement of the control piston in its entirety in a radial direction or a direction perpendicular to the direction of movement of the control piston. In addition the said displacement surface may be disposed on an outer circumference of the control piston. This is explained in greater detail with reference to the drawings.

In an exemplary embodiment the control piston is of multi-part and in particular two-part construction. In this case one of these several or two parts of the control piston may be made from a metal and the other from plastic.

In an exemplary embodiment a stop means, such as for example a stop screw, is disposed on the control piston. This top screw serves on the one hand as a stop and on the other hand also serves in some aspects as a cover to reduce the control air dead space volume.

In an exemplary embodiment the control piston is produced from a material which is selected from a group including metals, ceramic, magnesium, hard rubber and the like. As mentioned above, the guide or the guide cylinder is in some aspects produced from a plastic.

However, it would also be possible for the guide cylinder to be made from metal or ceramic. It would also be possible for the guide cylinder to be of multi-part construction and for example to have a guide body made from plastic for guiding the control piston as well as a basic body which carries this guide body. In this case this basic body may also form the control chamber.

In an exemplary embodiment the control piston has a plastic element. In this way it is possible for the control piston to be composed of a metal portion and a plastic portion. Thus it would be possible for example for a plastic segment to be accommodated in a hollow space in the control piston. It would also be possible for a sealing surface to be formed from plastic on the end of the control piston. In addition it would be possible for a plastic element to be worked into a control piston which is otherwise made from metal.

Further advantages and embodiments are apparent from the appended drawings.

BRIEF DESCRIPTION OF THE DRAWINGS

In the figures:

FIG. 1 shows a schematic representation of a device for blow moulding containers;

FIG. 2a shows a valve block according to the prior art;

FIG. 2b shows a detail of the valve block of FIG. 2a;

FIG. 5a shows a detail of a unit according to various aspects of the disclosure;

FIG. 5b shows a further detail of a unit according to various aspects of the disclosure;

FIGS. 6a to 6c show three possible variants for the control piston according to various aspects of the disclosure;

FIGS. 7a to 7b show two partial views of a device according to various aspects of the disclosure;

FIG. 9a shows an exemplary embodiment of a form of pneumatic control unit according to various aspects of the disclosure;

FIG. 9b shows exemplary embodiment of a unit for controlling the blow pressure according to various aspects of the disclosure;

FIG. 10 shows an exemplary embodiment according to various aspects of the disclosure of a unit for controlling the blow pressure; and FIGS. 11a, 11b show two representations of an aseptic pilot valve according to various aspects of the disclosure.

DETAILED DESCRIPTION

Figure 3:
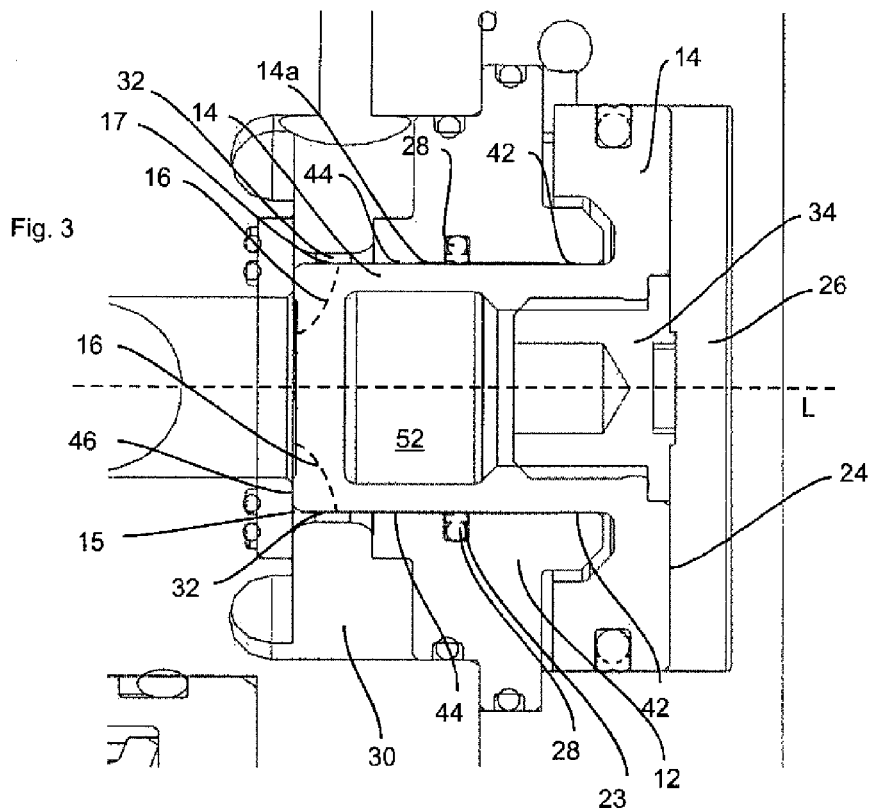
FIG. 3 shows a representation of an exemplary unit for pneumatic control of the blow pressure according to various aspects of the disclosure.

FIG. 1 shows a rough schematic representation of a device 1 for reshaping containers. This device has a rotatable holder, such as a blow wheel 2, on which a plurality of blow stations 4 is disposed. In this case these blow stations 4 each serve to reshape plastic parisons 10 to produce plastic containers. For this purpose the individual blow stations each have blow moulds which form a hollow space in their interior which serves for expansion of the plastic parisons 10. The individual blow stations in some aspects also have stretching rods which extend the plastic parisons in their longitudinal direction, so that this device is a stretch blow moulding machine.

FIG. 2a shows a valve block according to the prior art. This valve block has a blow moulding die 72 which is placed onto the plastic parisons 10 in order to apply compressed air to them to expand them. The reference numeral 110 relates to a housing of the valve block which is denoted as a whole by 120. The reference numeral 118 identifies a sound absorber.

FIG. 2b shows a more detailed representation of a valve block according to the prior art. It will be seen that delivery channels 104 are provided here, via which the blow air can be delivered to the plastic parison 10. The reference numeral 106 relates to a movable piston which in this case can be moved along the double arrow P for example by the use of guide curves or the like. The blow air for expansion of the plastic parisons 10 can be delivered via an annular chamber 102 by means of a valve (not shown).

FIG. 3 shows a representation of a unit 20 according to the disclosure for pneumatic control of the blow pressure or a control block 20 according to the disclosure. In this case this control block has a control piston 14 which is mounted so as to be movable along the longitudinal axis L. In detail, this control piston 14 is mounted so as to be movable in a cylinder 12 or a guide body 12.

In this case the control piston 14 is made at least in some portions from a metal and in particular it is made from a metal on its external circumference 14a. The cylinder or the guide cylinder 12 is made from a plastic here. Guide surfaces 42 and 44 which are likewise made from plastic are also integrated into this cylinder 12. The reference numeral 28 identifies a sealing unit which here is likewise disposed in a circumferential groove 23 on the cylinder 12. The reference numeral 16 identifies a main flow path which when the valve is open (the closed position is shown in FIG. 3) leads from an application chamber 30 to an outlet 31. Along this main flow path 16 the blow air reaches the plastic parisons (not shown).

The reference numeral 32 identifies ports which are uniformly distributed here in the circumferential direction of the control piston 14 and are disposed in particular in the cylinder 12. A surface 17 disposed on the outer circumference 14a of the control piston 14 lies opposite the individual ports 32 when the valve is in the closed state.

The reference numeral 46 relates to a sealing surface of the control piston 14 which covers the outlet channel 31 in the position shown in FIG. 3. Thus the sealing surface 46 also effects sealing of the main flow path 16. More precisely, in a closed state of the valve the control piston bears against a sealing body 36 which in this case is formed on the left-hand end of the cylinder 12. This sealing body 36 is in some aspects constructed integrally with the cylinder 36. This is explained in greater detail with reference to FIGS. 8a to 8d.

In the representation shown in FIG. 3 this sealing surface 46 is disposed on the control piston 14, more precisely a portion of the end face of the control piston forms the said sealing surface 46. Thus the control piston 14, which in this case is constructed as a metal piston (but can also be made from ceramic) is guided in an additional guide cylinder, i.e. the cylinder 12, which is made here from plastic. The cylinder serves at the same time for sealing the end face of the control piston 14 against the metal valve block. If the control piston 14 is made from ceramic the additional guide cylinder 12 can be omitted. The guide cylinder in turn can be accommodated in a receptacle such as a sleeve (not shown).

The control piston 14 is mounted directly on the guide points or fitting diameters 42, 44 integrated into the cylinder 12. In order to economise on the width the guide piston has a hollow pace 52 in its interior, or its interior is machined out to make it hollow. The reference numeral 34 identifies a stop screw. This stop screw 34 serves on the one hand to form a stop for the rearward movement of the control piston 14 and on the other hand this stop screw 34 also serves as a cover to reduce the control air/dead space volume, since the hollow space 52 is covered by this stop screw 34. The air ports 32 are disposed uniformly on the circumference of the control piston 14 and thereby provide that the compressed air flows symmetrically onto the piston.

The reference numeral 15 relates to a displacement surface constructed as an oblique surface which is disposed at the lower end of the control piston 14. This displacement surface or oblique surface 15, which is constructed circumferentially here, also serves as a displacement surface. A displacement surface is understood to be a surface or a portion which due to its (in particular geometric) arrangement is adapted, when acted upon by a gaseous medium, to generate a force which here acts in the longitudinal direction of the control piston. Thus the displacement surface in some aspects deflects a force acting on it. As soon as compressed air is applied to the chamber 30 surrounding the control piston 14, this pressure also acts on this displacement surface 15 and thereby causes the control piston 14 to be displaced back towards the right in FIG. 3.

However, in this case the unit 20 is designed so that when a control pressure of for example 10 bars prevails in the control chamber 26 the control piston 14 is in the left-hand position shown in FIG. 3. Only when the control pressure no longer prevails in the control chamber 26 can the control piston 14 move to the right in FIG. 3 due to the blow pressure. In this case the control pressure acts on the control surface 24 of the control piston 14.

Figure 4:
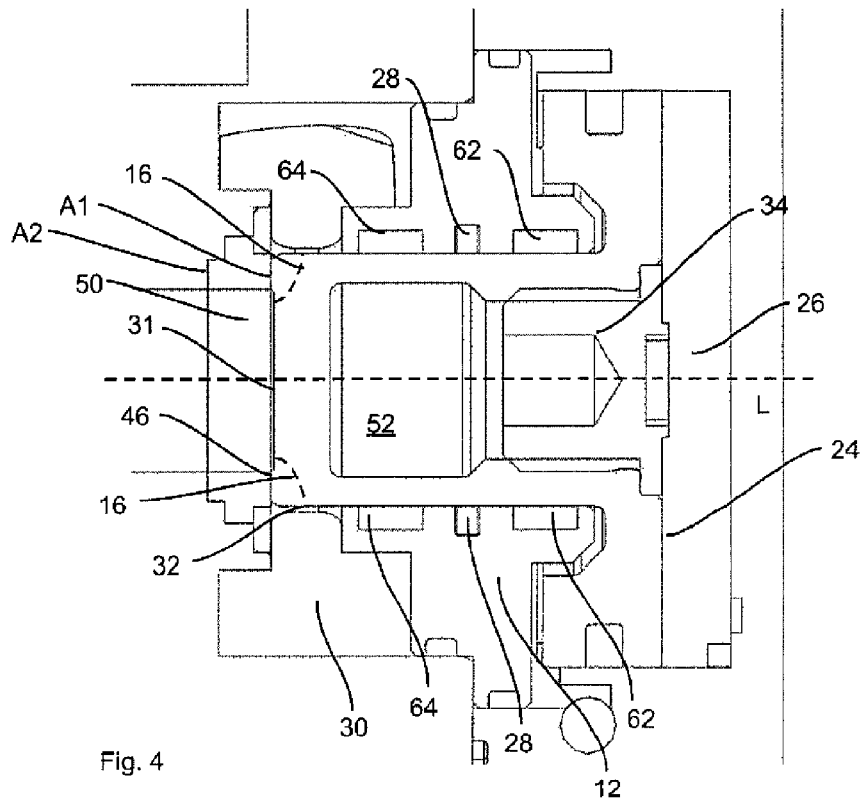
FIG. 4 shows an exemplary embodiment of a unit according to various aspects of the disclosure.

FIG. 4 shows a further embodiment of a unit 20 according to the disclosure. In this embodiment sealing relative to the outlet 31 takes place with the aid of a plastic disc 50 which has surface A1, A2 of the same size on the pressure sides. In this way surfaces of the same size are produced during sealing.

Here the control piston 14 is mounted on guide strips 62, 64, which are inlaid in the cylinder 12. Here too a hollow space 52 is again provided in order to economise on weight, and also the stop screw shown in FIG. 3. As also in the case of FIG. 3, here too a symmetrical flow onto the control piston 12 is achieved through the ports 32 disposed uniformly on the circumference.

In this case the control piston can be made from metal, ceramic, optionally also from magnesium or hard rubber. The cylinder or the guide is in some aspects produced here from metal or ceramic.

FIG. 5a shows a further embodiment to illustrate the guiding. Here a seal 29 is provided on the control piston 29 and serves to seal the 10 bar pressure chamber. A further seal 28 is disposed in the cylinder 12. The control piston 14 here is guided exclusively on the small diameter D1 of the cylinder 12. The reference numerals 42 and 44 again relate to the respective guide surfaces.

FIG. 5b shows a further embodiment of a unit according to the disclosure. In this case a seal 29 is likewise provided in control piston 12 and also a seal 28 in the cylinder 12. However, the guiding of the piston takes place here both on the small diameter D1 and on the large diameter D2 of the control piston 12. The reference numerals 42 and 45 relate to the respective guide surfaces.

It may be desirable that in all the embodiments the guide surfaces are constructed in such a way that a purely metal contact of the guide surfaces is avoided, so that for example the guiding takes place between a plastic surface and a metal surface or between two plastic surfaces.

FIGS. 6a to 6c show three possible configurations of a control piston 14. In these embodiments the piston is in each case made up of two components. In detail in this case the piston has a basic body 14b. In the configuration shown in FIG. 6a a sealing surface 25 made from plastic is disposed on the basic body 14b. In the variant shown in FIG. 6b a sealing surface 27 is provided which engages behind a region of the basic body 14b. In this case this sealing surface 27 is vulcanised onto the basic body 14b.

In the embodiment shown in FIG. 6c the sealing surface 25 is likewise made from plastic and is vulcanised into the basic body 14b with a basic portion 21.

FIG. 7a shows a detail for illustration of the sealing surfaces. Here too, a circumferential wall 14a of the control piston 14 blocks the main flow path 15. However, in this case the control piston has a recess 18, so that the delivered blow air flows onto the entire circumference of the control piston. The sealing takes place here by way of the two surfaces A1 and A2. More precisely, here too a plastic disc 50 is provided, against which the control piston 14 bears via the surface A1 for the purpose of sealing. Therefore in the embodiments shown it is also not necessary for the control piston to contact the plastic guide at all points over its circumference. Thus in the embodiment illustrated in FIG. 7a it is ensured that in each case a metal or ceramic surface seals against a plastic surface. Here too the two surfaces A1 and A2 are in some aspects the same size.

FIG. 7b shows a further embodiment for illustration of the sealing. Here again two sealing surfaces A1 and A2 are provided by means of which the sealing takes place. Here too the control piston 14 has a recess 19 which in this case is constructed as a circumferential groove. In both illustrations the reference numeral 46 relates to the sealing surface formed on the control piston 14. The two surfaces A1 and A2 are in some aspects parallel to one another and in some aspects are offset with respect to one another in the longitudinal direction of the control piston 14.

Figure 8A:
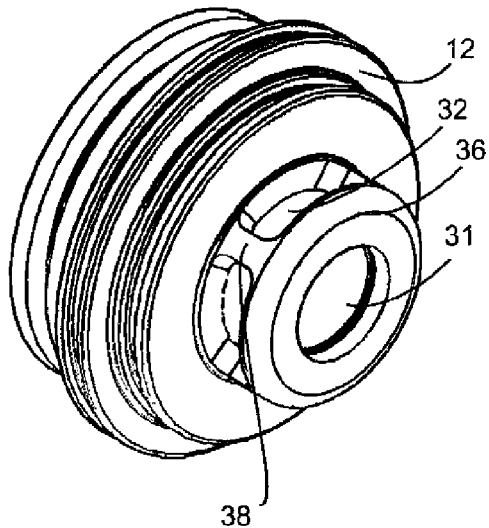
FIGS. 8a to 8d show four representations of an exemplary embodiment of a valve according to various aspects of the disclosure.

FIGS. 8a to 8d show various representations of the cylinder 12, in some cases with the control piston 14 disposed therein. In FIG. 8a it can be seen that a sealing body 36 is formed on the cylinder 12. More precisely, this sealing body 36 is disposed in one piece on the cylinder 12. The inner face (not shown in FIG. 8a) of the sealing body 36 serves for sealing of the valve when a corresponding end face of the control piston 14 bears against it. The sealing body 36 is disposed by means of webs 38 on the basic body of the cylinder 12, and the individual ports 32 through which the blow air can enter are formed between these webs.

Figure 8B:
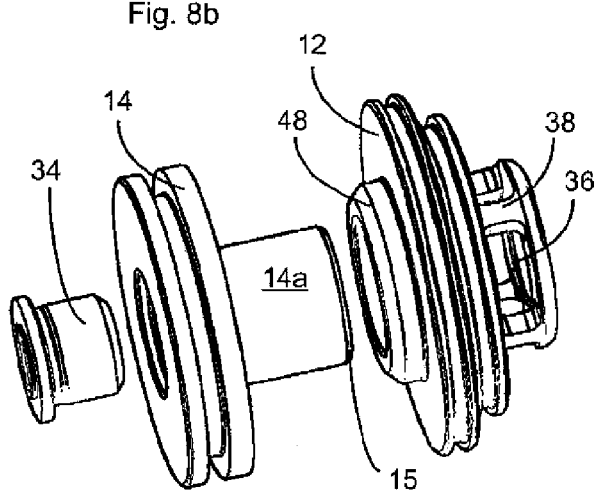

FIG. 8b shows a representation of the cylinder 12 shown in FIG. 8a and the control piston 14 to be disposed so as to be movable therein. It can be seen that the control piston 14 here is formed overall in two parts and, more precisely, has a stop screw 34 which is screwed into a corresponding hollow space in the control piston. The reference numeral 48 relates to a circumferential projection which is disposed on the cylinder 12. Furthermore, here too the displacement surface 15 can be seen which, when acted upon by compressed air, causes the control piston to move to the left relative to the cylinder 12 in FIG. 8b.

Figure 8C:
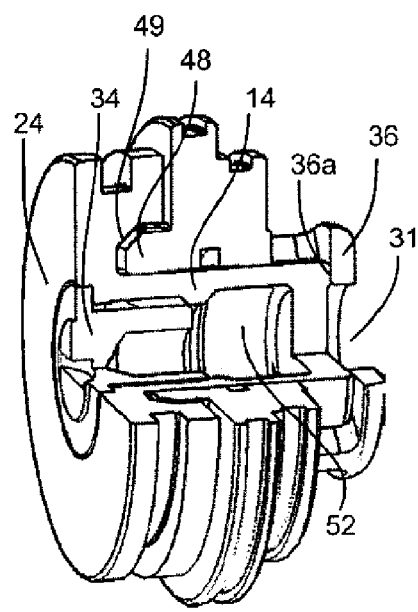
Figure 8D:
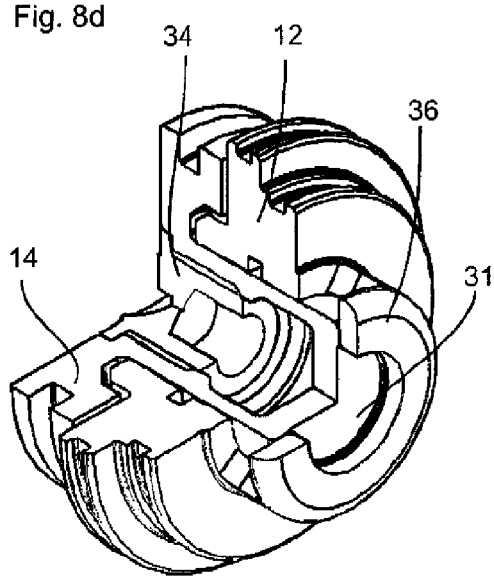

FIG. 8c shows a sectional representation of the cylinder 12 with the control piston 14 disposed therein. It can be seen that the circumferential projection 48 can penetrate into a recess 49 which is formed in the control piston 14. The reference numeral 36a identifies the above-mentioned inner face of the sealing body 36 which together with the end face 14c of the control piston 14 (or a—in particular annular—part of this end face 14c serves for sealing of the valve). FIG. 8d shows a further sectional representation in which in particular the end face 14c of the control piston 14 is also visible.

FIG. 9a shows a further possible embodiment of a unit according to the disclosure. In this embodiment the control piston 14 does not have the oblique surfaces 15 shown in FIGS. 3 and 4. Therefore the oblique inflow onto the control piston 14 originating from the annular chamber 30 does not exert an axial force, because the pressure is not applied on the end face of the piston. For this reason a further (forced) control is provided with the aid of two additional valves 82 and 84, which function here as pilot valves. By means of a first pilot valve 82 it is possible to apply control air to an annular surface 86 in order in this way to move the control piston 14 into its rear position (i.e. to the right) along the arrow P1 in FIG. 7. In this position the working compressed air can flow into the plastic parison. The movement of the control piston 14 can be achieved by a second pilot valve 84 which in turn applies compressed air to the control chamber 26 and in this way causes a movement of the control piston 14 to the left, i.e. contrary to the arrow direction P1 in FIG. 7.

In the embodiment shown in FIG. 9b a combination of an additional piston and an air spring is used. This system pressure of 10 bars acts here in the control chamber 26 and in this way causes the control piston to be pressed into the forward position and in this way closes the "P1" valve. Compressed air is applied to the annular surface 86 by means of the pilot valve 82 and the control piston 14 can be moved thereby into the rear position and in this way the working compressed air can flow into the plastic parison.

In the embodiment shown in FIG. 10 the unit has an additional piston. In this embodiment the working compressed air (e.g. at 40 bars) acts permanently on the annular surface 86, so that the control piston 14 is pushed into the rear position and in this way the valve is opened (i.e. here the working compressed air can flow into the plastic parison).

Control air is applied to the circular surface or control surface 24 by means of a pilot valve 84 and thereby the control piston 14 is moved into the forward position and in this way closes the valve. However it would also be possible for the valve to be reset in another way, for instance by a spring. Also an electromagnet could be provided, which moves the control piston 14 to the right in the drawings or opens the valve.

In an exemplary embodiment the device or the units have/has pressure sensors for pneumatic control of the blow pressure. Such pressure sensors usually contain the pressure sensor itself and the electronic evaluation means in a housing. In order that the pressure sensor can be positioned nearer to the process it is proposed here to construct the pressure sensor in two parts and in particular to provide the electronic evaluation means spaced from the actual pressure sensor. Therefore the electronic evaluation means and the pressure sensor itself are in some aspects designed as different components and in particular are separate from one another.

Furthermore, therefore, the present disclosure is directed to a device according to the preamble to Claim 1, wherein according to the disclosure this device has a pressure sensor in order to determine at least a pressure occurring in the unit, and wherein an electronic evaluation means of this pressure sensor is disposed separately from the actual pressure sensor. The pressure sensor is in some aspects disposed directly on the unit for pneumatic control of the blow pressure.

In other words the pressure sensor can be positioned directly in the pressure chamber, for example the annular chamber 30 to which the blow pressure is applied, and the electronic evaluation means is positioned outside. In this way the control block as a whole can be made more compact.

In an exemplary embodiment which, however, can also be used independently of the disclosure, the venting of the valves, such as for example the pilot valves 82 and 84, takes place through air channels (not shown) in the control block. In this way it is possible for the sound absorber 118 shown in FIG. 2a to be disposed in a non-aseptic region. This procedure is particularly suitable in an aseptic design of the control block.

In an exemplary embodiment the unit for pneumatic control has two pilot valves and furthermore the control block has two outlet (exhaust) valves. In this case, however, these valves are redundant and are intended in particular or only for reliable opening of the unit in the event of failure of a pilot valve. In this case it would be possible for two (redundant) pilot valves to be installed on an outlet valve, which is in some aspects for a space-saving solution for reliable opening.

FIGS. 11a and 11b show two possible designs of an aseptic pilot valve 90. In this case the reference numerals 92 and 94 each relate to a signal connection, in FIG. 10b the two ports 96 and 98 on working connections, the reference numeral 95 relates to a connection for a sound absorber and the reference numeral 93 relates to a supply connection (in particular for air). In this case it would also be possible for one or several of the pilot valves shown in the preceding drawings to be constructed as a unit and for example to be cast in plastic. The signal connections 92 and 94 can be constructed for example as IP67-compliant plugs or also as cables cast gap-free. The air connections (for air supply and sound absorber) can not only be separate for each pilot valve but also they can be used jointly.

It will be apparent to those skilled in the art that various modifications and variations can be made to the device for blow moulding containers of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. Device with blow stations disposed on a blow wheel for blow moulding containers from a thermoplastic material, the device comprising:
   a unit for pneumatic control of a blow pressure, the pneumatic control unit having a control piston which is guided in a cylinder and is mounted so as to be movable in the direction of a longitudinal axis of the piston;
   a main flow path extending through the cylinder, the control piston being operable to close the main flow path; and
   a control surface provided with the control piston, the control surface facing a control chamber of the cylinder, the control surface being designed to transmit a control force to the control piston,
   wherein the control piston is constructed at least in some regions from a metal or a ceramic, and
   wherein the main flow path is located in a circumferential wall of the cylinder, and wherein the main flow path is covered or sealed by an external circumference of the pneumatic control unit, and not covered or sealed by a base structure of the control piston.

2. Device as claimed in claim 1, wherein the cylinder has guide surfaces made from plastic for guiding the control piston.

3. Device as claimed in claim 1, wherein the main flow path is disposed in such a way that, when the control pressure is lowered, the control piston is displaced by the acting high pressure in the direction of the longitudinal axis of the piston.

4. Device as claimed in claim 1, wherein the control piston is made completely from a metal or from ceramic.

5. Device as claimed in claim 1, wherein the control piston has a hollow space.

6. Device as claimed in claim 1, wherein at least one sealing unit is disposed in the cylinder in order to seal the movement of the control piston.

7. Device as claimed in claim 1, wherein the device has an application chamber which surrounds the control piston in the circumferential direction thereof and can be supplied with blow air.

8. Device as claimed in claim 1, wherein the control piston has a displacement surface which, with the application of compressed air, moves the control piston along the longitudinal axis of the piston.

9. Device as claimed in claim 1, wherein the control piston is of multi-part construction.

10. Device as claimed in claim 1, wherein the control piston is of two-part construction.

11. Device as claimed in claim 1, wherein the control piston has a stop screw.

12. Device as claimed in claim 1, wherein the control piston has a plastic element.

13. Device with blow stations disposed on a blow wheel for blow moulding containers from a thermoplastic material, the device comprising:
   a unit for pneumatic control of a blow pressure, the pneumatic control unit including
      a cylinder having a control chamber, and
      a control piston guidingly movable in the cylinder in the direction of a longitudinal axis of the piston, the control piston having a control surface, the control surface facing the control chamber of the cylinder, the control surface being designed to transmit a control force to the control piston; and
      a main flow path extending through the cylinder, the control piston being operable to close the main flow path,
   wherein the control piston is constructed at least in some regions from one of a metal and a ceramic, and
   wherein the main flow path is located in a circumferential wall of the cylinder, and wherein the main flow path is covered or sealed by an external circumference of the pneumatic control unit, and not covered or sealed by a base structure of the control piston.

14. Device as claimed in claim 13, wherein the cylinder has guide surfaces made from plastic for guiding the control piston.

15. Device as claimed in claim 13, further comprising at least one sealing unit in the cylinder in order to seal the movement of the control piston.

16. Device as claimed in claim 13, further comprising an application chamber which surrounds the control piston in the circumferential direction thereof and can be supplied with blow air.

17. Device as claimed in claim 13, wherein the control piston has a displacement surface which, with the application of compressed air, moves the control piston along the longitudinal axis of the piston.

18. Device as claimed in claim 1, wherein the inlet is formed by a plurality of ports, through which the blow air can enter, which are uniformly distributed in the circumferential direction of the control piston and are disposed in the cylinder, and wherein in a closed state of the pneumatic control unit the ports are closed by the external circumference of the control piston, the device further comprising a plurality of air ports disposed uniformly on the circumference of the control piston, wherein in a closed state of the means or of the valve these air ports are closed by the external circumference of the control piston.

* * * * *